(12) United States Patent
Abad

(10) Patent No.: US 10,689,507 B2
(45) Date of Patent: Jun. 23, 2020

(54) RUBBER COMPOSITION COMPRISING A STYRENE-BUTADIENE COPOLYMER HAVING A LOW GLASS TRANSITION TEMPERATURE, AND A HIGH CONTENT OF FILLER AND OF PLASTICIZER

(71) Applicant: COMPAGNIE GENERALE DES ETABLISSEMENTS MICHELIN, Clermont-Ferrand (FR)

(72) Inventor: Vincent Abad, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 170 days.

(21) Appl. No.: 15/737,061

(22) PCT Filed: Jun. 17, 2016

(86) PCT No.: PCT/EP2016/063987
§ 371 (c)(1),
(2) Date: Dec. 15, 2017

(87) PCT Pub. No.: WO2016/202968
PCT Pub. Date: Dec. 22, 2016

(65) Prior Publication Data
US 2018/0186978 A1 Jul. 5, 2018

(30) Foreign Application Priority Data
Jun. 18, 2015 (FR) ...................................... 15 55567

(51) Int. Cl.
| | | |
|---|---|---|
| *C08L 9/06* | (2006.01) |
| *B60C 1/00* | (2006.01) |
| *C08K 3/06* | (2006.01) |
| *C08L 57/02* | (2006.01) |
| *C08K 3/36* | (2006.01) |
| *C08K 3/04* | (2006.01) |
| *C08L 91/00* | (2006.01) |

(52) U.S. Cl.
CPC .............. *C08L 9/06* (2013.01); *B60C 1/0016* (2013.01); *C08K 3/04* (2013.01); *C08K 3/06* (2013.01); *C08K 3/36* (2013.01); *C08L 57/02* (2013.01); *C08L 91/00* (2013.01)

(58) Field of Classification Search
CPC ........................................................ C08L 9/06
See application file for complete search history.

(56) References Cited

U.S. PATENT DOCUMENTS

| | | |
|---|---|---|
| 5,227,425 A | 7/1993 | Rauline |
| 5,852,099 A | 12/1998 | Vanel |
| 5,900,449 A | 5/1999 | Custodero et al. |
| 5,977,238 A | 11/1999 | Labauze |
| 6,013,718 A | 1/2000 | Cabioch et al. |
| 6,420,488 B1 | 7/2002 | Penot |
| 6,503,973 B2 | 1/2003 | Robert et al. |
| 6,536,492 B2 | 3/2003 | Vasseur |
| 6,774,255 B1 | 8/2004 | Tardivat et al. |
| 6,815,473 B2 | 11/2004 | Robert et al. |
| 7,217,751 B2 | 5/2007 | Durel et al. |
| 7,250,463 B2 | 7/2007 | Durel et al. |
| 7,300,970 B2 | 11/2007 | Durel et al. |
| 7,312,264 B2 | 12/2007 | Gandon-Pain |
| 7,335,692 B2 | 2/2008 | Vasseur et al. |
| 7,488,768 B2 | 2/2009 | Tardivat et al. |
| 7,491,767 B2 | 2/2009 | Durel et al. |
| 7,820,771 B2 | 10/2010 | Lapra et al. |
| 7,825,183 B2 | 11/2010 | Robert et al. |
| 7,834,074 B2 | 11/2010 | Brunelet et al. |
| 7,882,874 B2 | 2/2011 | Robert et al. |
| 8,344,063 B2 | 1/2013 | Marechal et al. |
| 8,455,584 B2 | 6/2013 | Robert et al. |
| 8,461,269 B2 | 6/2013 | Varagniat et al. |
| 8,492,475 B2 | 7/2013 | Araujo Da Silva et al. |
| 8,883,929 B2 | 11/2014 | Gandon-Pain et al. |
| 2001/0034389 A1 | 10/2001 | Vasseur |
| 2001/0036991 A1 | 11/2001 | Robert et al. |
| 2002/0183436 A1 | 12/2002 | Robert et al. |
| 2004/0051210 A1 | 3/2004 | Tardivat et al. |
| 2004/0092647 A1* | 5/2004 | Chauvin ................... B60C 1/00 524/496 |
| 2004/0127617 A1 | 7/2004 | Vasseur et al. |
| 2004/0132880 A1 | 7/2004 | Durel et al. |
| 2005/0004297 A1 | 1/2005 | Durel et al. |
| 2005/0016650 A1 | 1/2005 | Durel et al. |
| 2005/0016651 A1 | 1/2005 | Durel et al. |
| 2006/0089445 A1 | 4/2006 | Gandon-Pain |
| 2008/0009564 A1 | 1/2008 | Robert et al. |
| 2008/0132644 A1 | 6/2008 | Lapra et al. |
| 2008/0156404 A1 | 7/2008 | Brunelet et al. |

(Continued)

FOREIGN PATENT DOCUMENTS

| | | |
|---|---|---|
| CN | 103857736 A | 6/2014 |
| EP | 0501227 A1 | 9/1992 |

(Continued)

OTHER PUBLICATIONS

International Search Report dated Jul. 22, 2016, in corresponding PCT/EP2016/063987.

*Primary Examiner* — Vickey Nerangis

(74) *Attorney, Agent, or Firm* — Venable LLP

(57) ABSTRACT

A rubber composition is based on at least 80 phr (parts by weight per hundred parts by weight of elastomer) of a styrene/butadiene elastomer (SBR) referred to as low-Tg SBR, the glass transition temperature (Tg) of which is less than −60° C.; at least 130 phr of reinforcing filler; at least 110 phr in total of a plasticizing system comprising a hydrocarbon-based resin at a content within a range extending from 70 to 100 phr and a plasticizing oil at a content within a range extending from 10 to 40 phr; and a vulcanization system.

11 Claims, No Drawings

(56) References Cited

U.S. PATENT DOCUMENTS

| | | |
|---|---|---|
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-Pain et al. |
| 2010/0022714 A1 | 1/2010 | Varagniat et al. |
| 2010/0184912 A1 | 7/2010 | Marechal et al. |
| 2010/0204359 A1 | 8/2010 | Robert et al. |
| 2010/0249270 A1 | 9/2010 | Robert et al. |
| 2010/0252156 A1 | 10/2010 | Robert et al. |
| 2011/0021702 A1 | 1/2011 | Gandon-Pain et al. |
| 2011/0152458 A1 | 6/2011 | Araujo Da Silva et al. |
| 2011/0263750 A1 * | 10/2011 | Lopitaux ............... B60C 1/0016 523/156 |
| 2012/0208948 A1 | 8/2012 | Gandon-Pain et al. |
| 2012/0252928 A1 | 10/2012 | Marechal et al. |
| 2013/0274404 A1 | 10/2013 | Vasseur et al. ............... 524/526 |
| 2014/0371346 A1 | 12/2014 | Saintigny et al. |

FOREIGN PATENT DOCUMENTS

| | | |
|---|---|---|
| EP | 0735088 A1 | 10/1996 |
| EP | 0810258 A1 | 12/1997 |
| EP | 1127909 A1 | 8/2001 |
| FR | 2740778 A1 | 5/1997 |
| FR | 2765882 A1 | 1/1999 |
| WO | 97/36724 A2 | 10/1997 |
| WO | 99/16600 A1 | 4/1999 |
| WO | 00/05300 A1 | 2/2000 |
| WO | 00/05301 A1 | 2/2000 |
| WO | 01/92402 A1 | 12/2001 |
| WO | 02/30939 A1 | 4/2002 |
| WO | 02/31041 A1 | 4/2002 |
| WO | 02/083782 A1 | 10/2002 |
| WO | 02/088238 A1 | 11/2002 |
| WO | 03/002648 A1 | 1/2003 |
| WO | 03/002649 A1 | 1/2003 |
| WO | 03/016387 A1 | 2/2003 |
| WO | 2004/096865 A1 | 11/2004 |
| WO | 2005/087859 A1 | 9/2005 |
| WO | 2006/061064 A1 | 6/2006 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |
| WO | 2008/141702 A1 | 11/2008 |
| WO | 2009/000750 A1 | 12/2008 |
| WO | 2009/000752 A1 | 12/2008 |
| WO | 2011/042507 A1 | 4/2011 |
| WO | 2012/069585 A1 | 5/2012 |
| WO | 2013/040425 A1 | 3/2013 |
| WO | WO-2013039499 A1 * | 3/2013 ........... B60C 1/0016 |

* cited by examiner

RUBBER COMPOSITION COMPRISING A STYRENE-BUTADIENE COPOLYMER HAVING A LOW GLASS TRANSITION TEMPERATURE, AND A HIGH CONTENT OF FILLER AND OF PLASTICIZER

FIELD OF THE INVENTION

The invention relates to compositions, especially for tyres, and more particularly to compositions comprising a styrene and butadiene copolymer elastomer having a low glass transition temperature (Tg).

RELATED ART

Since fuel savings and the need to protect the environment have become a priority, it has proved necessary to produce tyres having a reduced rolling resistance, without adversely affecting other properties of the tyre. Manufacturers have developed tyre compositions which make it possible to reduce this rolling resistance, especially by introducing silica as reinforcing filler, or resin having a high glass transition temperature as plasticizer.

For example, the applicants have already described the use of high-Tg resins, as described in documents WO-2005/087859 or WO-2006/061064.

Moreover, document WO-2013/039499 describes compositions comprising high filler contents, and a plasticizing system comprising a hydrocarbon-based resin and a plasticizing oil, the total plasticizer contents being of the order of 60 to 100 phr, with approximately 20 to 40 phr of oil and 40 to 60 phr of resin, these compositions making it possible to obtain variable properties of grip and wear in tyres.

Nonetheless, manufacturers are always seeking solutions to improve the performance of compositions for tyres, and especially the rolling resistance, grip, wear and stiffness of the cured compositions, associated with road behaviour and driving comfort, at the same time as the viscosity of the uncured compositions, associated with the ease of industrial processing of the compositions (processability).

The applicants have now shown that particular compositions based on at least one specific elastomer, a high content of reinforcing filler and a specific plasticizing system comprising a very high content of resin, made it possible to have an improved compromise between numerous desired performance properties for tyre compositions, that is to say rolling resistance, grip, wear and stiffness of the cured compositions, associated with road behaviour and driving comfort, at the same time as the viscosity of the uncured compositions, associated with the ease of industrial processing of the compositions (processability).

BRIEF DESCRIPTION OF EMBODIMENTS OF THE INVENTION

The invention therefore relates to a rubber composition based on at least 80 phr (parts by weight per hundred parts by weight of elastomer) of a styrene/butadiene elastomer (SBR) referred to as low-Tg SBR, the glass transition temperature (Tg) of which is less than −60° C.; at least 130 phr of reinforcing filler; at least 110 phr in total of a plasticizing system comprising a hydrocarbon-based resin at a content within a range extending from 70 to 100 phr and a plasticizing oil at a content within a range extending from 10 to 40 phr; and a vulcanization system.

The invention preferably relates to a composition as defined above, wherein said low-Tg SBR has a styrene content within a range extending from 3 to 40% by weight, preferentially from 3 to 30% by weight. Also preferentially, said low-Tg SBR has a butadiene fraction having a content of 1,2-vinyl bonds of between 4% and 30% (mol %), preferably between 4% and 25%. Preferably, said low-Tg SBR has a Tg of less than −60° C., preferably within a range extending from −60° C. to −110° C., preferentially from −65° C. to −95° C. Also preferably, said low-Tg SBR is functionalized by a function selected from the group consisting of functional groups comprising a carbon-tin bond, amino functional groups, functional groups comprising a silanol, functional groups comprising an alkoxysilane, carboxyl groups, polyether groups, epoxide groups and mixtures thereof; and more preferentially, said low-Tg SBR is functionalized by a function selected from the group consisting of functional groups comprising a carbon-tin bond, amino functional groups, functional groups comprising a silanol, functional groups comprising an alkoxysilane and mixtures thereof.

According to a preferential embodiment of the invention, said composition does not comprise other diene elastomers, the total content of low-Tg SBR being 100 phr.

According to another preferential embodiment of the invention, wherein the composition also comprises another diene elastomer at a content within a range extending from 5 to 20 phr and preferably from 5 to 15 phr. In this case, said other diene elastomer is preferably selected from the group consisting of polybutadienes, synthetic polyisoprenes, natural rubber, butadiene copolymers, isoprene copolymers and the mixtures of these elastomers.

Preferentially, the invention relates to a composition as defined above in which the reinforcing filler is selected from the group consisting of silicas, carbon blacks and the mixtures thereof.

Also preferentially, the invention relates to a composition as defined above, wherein the content of reinforcing filler is within a range extending from 130 to 160 phr, preferably from 135 to 155 phr.

According to a preferred variant, the invention relates to a composition as defined above, wherein the predominant reinforcing filler is carbon black. Preferentially, the content of carbon black is within a range extending from 70 to 155 phr and preferably from 95 to 150 phr.

According to another preferred variant, the invention relates to a composition as defined above, wherein the predominant reinforcing filler is silica. Preferentially, the content of silica is within a range extending from 70 to 155 phr and preferably from 95 to 150 phr.

The invention preferably relates to a composition as defined above, wherein the total content of plasticizers is within a range extending from 110 to 160 phr, preferably from 110 to 150 phr, and preferentially from 115 to 130 phr.

Also preferably, the invention relates to a composition as defined above, wherein the content of hydrocarbon-based resin is within a range extending from 80 to 95 phr, preferably from 85 to 90 phr.

Preferentially, the invention relates to a composition as defined above, wherein the hydrocarbon-based resin has a Tg of greater than 0° C., preferably greater than 30° C.

Also preferentially, the invention relates to a composition as defined above, wherein the hydrocarbon-based resin has a number-average molecular weight of between 400 and 2000 g/mol, preferably between 500 and 1500 g/mol.

Preferentially, the invention relates to a composition as defined above, wherein the hydrocarbon-based resin has a polydispersity index (PI) of less than 3, preferably less than 2.

Also preferentially, the invention relates to a composition as defined above, wherein the plasticizing oil is selected from the group consisting of naphthenic oils, paraffinic oils, MES (medium extracted solvates) oils, TDAE (treated distillate aromatic extracts) oils, mineral oils, vegetable oils, ether plasticizers, ester plasticizers, phosphate plasticizers, sulfonate plasticizers and the mixtures of these compounds.

The invention preferably relates to a composition as defined above, wherein the content of plasticizing oil is within a range extending from 15 to 35 phr, preferably from 20 to 30 phr.

The invention also relates to a tyre comprising a composition as defined above, preferably in all or part of the tread thereof.

The tyre according to the invention will preferentially be selected from the tyres intended to equip a two-wheel vehicle, a passenger vehicle, or else a "heavy-duty" vehicle (that is to say, underground, bus, off-road vehicles, heavy road transport vehicles, such as lorries, tractors or trailers), or else aircraft, construction equipment, heavy agricultural vehicles or handling vehicles.

DETAILED DESCRIPTION OF EMBODIMENTS OF THE INVENTION

I-Constituents of the Composition

The rubber compositions according to the invention are based on at least 80 phr (parts by weight per hundred parts by weight of elastomer) of a styrene/butadiene elastomer (SBR) referred to as low-Tg SBR, the glass transition temperature (Tg) of which is less than $-60°$ C.; at least 130 phr of reinforcing filler; at least 110 phr in total of a plasticizing system comprising a hydrocarbon-based resin at a content within a range extending from 70 to 100 phr and a plasticizing oil at a content within a range extending from 10 to 40 phr; and a vulcanization system.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

In the present description, unless expressly indicated otherwise, all the percentages (%) shown are percentages by weight.

Moreover, the term "phr" means, within the meaning of the present patent application, parts by weight per hundred parts of elastomer, thermoplastic and non-thermoplastic elastomers mixed together. Within the meaning of the present invention, thermoplastic elastomers (TPEs) are included among the elastomers.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

Finally, when reference is made to a "predominant" compound, this is intended to mean, within the context of the present invention, that this compound is predominant among the compounds of the same type in the composition, that is to say that it is the one which represents the greatest amount by weight among the compounds of the same type. Thus, for example, a predominant reinforcing filler is the reinforcing filler representing the greatest weight with respect to the total weight of the reinforcing fillers in the composition. On the contrary, a "minor" compound is a compound which does not represent the greatest fraction by weight among the compounds of the same type.

I-1 Diene Elastomer

The compositions according to the invention comprise, as elastomer, at least 80 phr of what is referred to as a low-Tg elastomer, namely a styrene/butadiene random copolymer, the glass transition temperature (Tg) of which, measured by DSC according to standard ASTM D3418, is less than or equal to $-60°$ C. The composition may also comprise, as an optional supplement to the low-Tg SBR, another diene elastomer at a maximum content of 20 phr.

I-1.1 Low-Tg SBR

The low-Tg SBRs may contain between 99% and 20% by weight of butadiene units and between 1% and 80% by weight of styrene units. The low-Tg SBRs may have any microstructure, which is dependent on the polymerization conditions used, especially on the presence or absence of a modifying and/or randomizing agent and on the amounts of modifying and/or randomizing agent used, as long as it has a Tg of less than $-60°$ C. The low-Tg SBRs may be prepared in dispersion or in solution; they may be coupled and/or star-branched or else functionalized with a coupling and/or star-branching and/or functionalization agent. For coupling to carbon black, mention may for example be made of functional groups comprising a C-Sn bond or amino functional groups, such as aminobenzophenone, for example; for coupling to a reinforcing inorganic filler such as silica, mention may for example be made of silanol functional groups or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973, WO 2009/000750 and WO 2009/000752). As other examples of functionalized low-Tg SBRs, mention may also be made of the SBRs of epoxidized type.

Thus, according to one preferential embodiment, the low-Tg SBR is functionalized by a function selected from the group consisting of functional groups comprising a carbon-tin bond, amino functional groups, functional groups comprising a silanol, functional groups comprising an alkoxysilane, carboxyl groups, polyether groups, epoxide groups and mixtures thereof. The function is preferably selected from the group consisting of functional groups comprising a carbon-tin bond, amino functional groups, functional groups comprising a silanol, functional groups comprising an alkoxysilane and mixtures thereof.

These functionalized low-Tg SBRs may be used in a blend with one another or with non-functionalized low-Tg SBRs. For example, it is possible to use a silanol- or polysiloxane-functionalized low-Tg SBR having a silanol end, in a mixture with a low-Tg SBR coupled and/or star-branched with tin (described in WO 11/042507), the latter representing a content of from 5% to 50%, for example from 25% to 50%.

In particular, the low-Tg SBRs having a glass transition temperature (Tg), measured by DSC according to standard ASTM D3418, of less than $-60°$ C., preferably within a range extending from −60° C. to −110° C., preferentially from −65° C. to −95° C., are suitable.

In particular, the low-Tg SBRs having a styrene content (weight %) of between 3% and 40% and more particularly between 3% and 30%, preferentially between 3% and 25% or between 15% and 30%, are suitable.

In particular, the low-Tg SBRs having a butadiene fraction having a content (mol %) of 1,2-vinyl bonds of between 4% and 30%, preferably between 4% and 25%, more preferentially between 4% and 20%, are suitable.

I-1.2 Other Diene Elastomer

The composition may also comprise, as an optional supplement to the low-Tg SBR, another diene elastomer which may be selected from all the diene elastomers known to those skilled in the art.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

Diene elastomers can be classified into two categories: "essentially unsaturated" or "essentially saturated". "Essentially unsaturated" is generally understood to mean a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not come within the preceding definition and can especially be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given these definitions, diene elastomer capable of being used in the compositions according to the invention is understood more particularly to mean:

(a) any homopolymer obtained by polymerization of a conjugated diene monomer having from 4 to 12 carbon atoms;

(b) any copolymer obtained by copolymerization of one or more conjugated dienes with one another or with one or more vinylaromatic compounds having from 8 to 20 carbon atoms;

(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, especially, 1,4-hexadiene, ethylidenenorbornene or dicyclopentadiene;

(d) a copolymer of isobutene and of isoprene (butyl rubber) and also the halogenated versions, in particular chlorinated or brominated versions, of this type of copolymer.

Although it applies to any type of diene elastomer, those skilled in the art of tyres will understand that the present invention is preferably employed with essentially unsaturated diene elastomers, in particular of the above type (a) or (b).

The following are especially suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can contain between 99% and 20% by weight of diene units and between 1% and 80% by weight of vinylaromatic units. The elastomers can have any microstructure which depends on the polymerization conditions used, especially on the presence or absence of a modifying and/or randomizing agent and on the amounts of modifying and/or randomizing agent employed. The elastomers can, for example, be block, random, sequential or microsequential elastomers, and can be prepared in dispersion or in solution; they can be coupled and/or star-branched or else functionalized with a coupling and/or star-branching or functionalization agent. Mention may be made, for example, for coupling to carbon black, of functional groups comprising a C-Sn bond or amino functional groups, such as aminobenzophenone, for example; mention may be made, for example, for coupling to a reinforcing inorganic filler, such as silica, of silanol or polysiloxane functional groups having a silanol end (such as described, for example, in FR 2 740 778, U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909, U.S. Pat. No. 6,503,973, WO 2009/000750 and WO 2009/000752). Mention may also be made, as other examples of functionalized elastomers, of elastomers (such as SBR, BR, NR or IR) of the epoxidized type.

These functionalized elastomers can be used in a blend with one another or with non-functionalized elastomers. For example, it is possible to use a silanol- or polysiloxane-functionalized elastomer having a silanol end, in a mixture with an elastomer coupled and/or star-branched with tin (described in WO 11/042507), the latter representing a content of 5% to 50%, for example of 25% to 50%.

The following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature Tg, measured according to ASTM D3418) of between 0° C. and −60° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −5° C. and −60° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −20° C. and −70° C., are especially suitable.

To summarize, the diene elastomer of the composition is preferably selected from the group of highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds.

According to a preferential embodiment of the invention, the composition comprises a total of 100 phr of low-Tg SBR and therefore does not comprise any other diene elastomer.

According to another particular embodiment of the invention, the rubber composition comprises, for example, between 5 and 20 phr, in particular between 5 and 15 phr, of another diene elastomer, as described above.

I-2 Reinforcing Filler

The composition according to the invention comprises a reinforcing filler. Use may be made of any type of reinforcing filler known for its abilities to reinforce a rubber composition which can be used for the manufacture of tyres, for example an organic filler, such as carbon black, a reinforcing inorganic filler, such as silica or alumina, or else a blend of these two types of filler.

All carbon blacks, especially "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, applications WO 97/36724 or WO 99/16600).

Mention may be made, as examples of organic fillers other than carbon blacks, of functionalized polyvinyl organic fillers, such as described in applications WO-A-2006/069792, WO-A-2006/069793, WO-A-2008/003434 and WO-A-2008/003435.

The composition can contain one type of silica or a blend of several silicas. The silica used can be any reinforcing silica known to those skilled in the art, especially any precipitated or fumed silica having a BET surface area and a CTAB specific surface area both of less than 450 m²/g, preferably from 30 to 400 m²/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas "doped" with aluminium described in application EP-A-0735088, or the silicas with a high specific surface as described in application WO 03/16837.

The silica preferably has a BET surface area of between 45 and 400 m²/g, more preferentially of between 60 and 300 m²/g.

These compositions can optionally also contain, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

Use is made especially of silane polysulfides, referred to as "symmetrical" or "asymmetrical" depending on their specific structure, such as described, for example, in applications WO 03/002648 (or US 2005/016651) and WO 03/002649 (or US 2005/016650).

Suitable in particular, without the definition below being limiting, are silane polysulfides referred to as "symmetrical", corresponding to the following general formula (III):

in which:
x is an integer from 2 to 8 (preferably from 2 to 5);
A is a divalent hydrocarbon radical (preferably C1-C18 alkylene groups or C6-C12 arylene groups, more particularly C1-C10 alkylenes, especially C1-C4 alkylenes, in particular propylene);
Z corresponds to one of the formulae below:

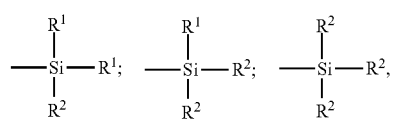

in which:
the R1 radicals, which are substituted or unsubstituted and identical to or different from one another, represent a C1-C18 alkyl, C5-C18 cycloalkyl or C6-C18 aryl group (preferably C1-C6 alkyl, cyclohexyl or phenyl groups, especially C1-C4 alkyl groups, more particularly methyl and/or ethyl).
the R2 radicals, which are substituted or unsubstituted and identical to or different from one another, represent a C1-C18 alkoxy or C5-C18 cycloalkoxy group (preferably a group selected from C1-C8 alkoxys and C5-C8 cycloalkoxys, more preferentially still a group selected from C1-C4 alkoxys, in particular methoxy and ethoxy).

In the case of a mixture of alkoxysilane polysulfides corresponding to the above formula (III), especially normal commercially available mixtures, the mean value of the "x" indices is a fractional number preferably of between 2 and 5, more preferentially of close to 4. However, the invention can also advantageously be carried out, for example, with alkoxysilane disulfides (x=2).

Mention will more particularly be made, as examples of silane polysulfides, of bis((C1-C4)alkoxy(C1-C4)alkylsilyl(C1-C4)alkyl) polysulfides (especially disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula [(C₂H₅O)₃Si(CH₂)₃S₂]₂, or bis(triethoxysilylpropyl) disulfide, abbreviated to TESPD, of formula $[(C_2H_5O)_3Si(CH_2)_3S]_2$. Mention will also be made, as preferential examples, of bis(mono(C1-C4)alkoxyldi(C1-C4)alkylsilylpropyl) polysulfides (especially disulfides, trisulfides or tetrasulfides), more particularly bis(monoethoxydimethylsilylpropyl) tetrasulfide, such as described in patent application WO 02/083782 (or US 2004/132880).

Mention will also be made, as coupling agent other than alkoxysilane polysulfide, of bifunctional POSs (polyorganosiloxanes), or else of hydroxysilane polysulfides (R2=OH in the above formula III), such as described in patent applications WO 02/30939 (or U.S. Pat. No. 6,774,255) and WO 02/31041 (or US 2004/051210), or else of silanes or POSs bearing azodicarbonyl functional groups, such as described, for example, in patent applications WO 2006/125532, WO 2006/125533 and WO 2006/125534.

In the rubber compositions in accordance with the invention, the content of coupling agent is preferentially between 7 and 18 phr, more preferentially between 8 and 17 phr and more preferentially still between 9 and 15 phr.

Those skilled in the art will understand that, as filler equivalent to silica described in the present section, use might be made of a reinforcing filler of another nature, especially of organic nature, provided that this reinforcing filler is covered with a layer of silica or else comprises functional sites, especially hydroxyl sites, at its surface which require the use of a coupling agent in order to form the bond between the filler and the elastomer.

The physical state in which the reinforcing filler is provided is not important, whether it is in the form of a powder, of microbeads, of granules, of beads or any other appropriate densified form.

For the purposes of the invention, the content of total reinforcing filler (carbon black and/or reinforcing inorganic filler, such as silica) is greater than 130 phr, preferably within a range extending from 130 to 160 phr, more preferentially from 135 to 155 phr and very preferentially from 145 to 155 phr. Below 130 phr of filler, the composition might have poorer performance with regard to dry and wet grip, whereas, above 160 phr of filler, the composition might have poorer performance with regard to rolling resistance.

Predominant reinforcing filler is understood to mean that which has the greatest content among the reinforcing fillers present in the composition. Predominant reinforcing filler is understood especially to mean any reinforcing filler which represents at least 50% by weight of the reinforcing fillers present, preferentially more than 50% and more preferentially more than 60%.

According to one preferential embodiment, the composition comprises carbon black as predominant filler, in an optional blend with silica as minor filler. In this case, the content of black is preferentially within a range extending from 70 to 155 phr and preferably from 95 to 150 phr. The content of silica is preferentially within a range extending from 0 to 60 phr and preferably from 0 to 35 phr. In this embodiment, the content of carbon black is preferentially greater than 130 phr and the content of silica is preferentially 0 phr or less than 10 phr.

According to another, more preferential, embodiment, the composition comprises silica as predominant filler, in an optional blend with carbon black, as minor filler. In this case, the content of silica is preferentially within a range extending from 70 to 155 phr and preferably from 95 to 150 phr. Preferentially, the content of carbon black is within a range extending from 0 to 60 phr and preferably from 0 to 35 phr. In this embodiment, the content of silica is preferentially greater than 130 phr and the content of black is preferentially less than or equal to 5 phr and preferentially within a range extending from 1 to 5 phr.

I-3 Vulcanization System

The vulcanization system per se is based on sulfur (or on a sulfur-donating agent) and on a primary vulcanization accelerator. Various known secondary vulcanization accelerators or vulcanization activators, such as zinc oxide, stearic acid or equivalent compounds, or guanidine derivatives (in particular diphenylguanidine), are added to this base vulcanization system, being incorporated during the first non-productive phase and/or during the productive phase, as described subsequently.

The sulfur is used at a preferential content of between 0.5 and 10 phr, more preferentially of between 0.5 and 5 phr, in particular between 0.5 and 3 phr, when the composition of the invention is intended, according to a preferential form of the invention, to constitute a tyre tread.

The vulcanization system of the composition according to the invention may also comprise one or more additional accelerators, for example compounds of the family of the thiurams, zinc dithiocarbamate derivatives, sulfenamides, guanidines or thiophosphates. Use may in particular be made of any compound capable of acting as accelerator for the vulcanization of diene elastomers in the presence of sulfur, especially accelerators of the thiazole type, and also their derivatives, and accelerators of thiuram and zinc dithiocarbamate type. These accelerators are more preferentially selected from the group consisting of 2-mercaptobenzothiazyl disulfide (abbreviated to MBTS), N-cyclohexyl-2-benzothiazolesulfenamide (abbreviated to CBS), N,N-dicyclohexyl-2-benzothiazolesulfenamide (abbreviated to DCBS), N-(tert-butyl)-2-benzothiazolesulfenamide (abbreviated to TBBS), N-(tert-butyl)-2-benzothiazolesulfenimide (abbreviated to TBSI), zinc dibenzyldithiocarbamate (abbreviated to ZBEC) and the mixtures of these compounds. Use is preferably made of a primary accelerator of the sulfenamide type.

I-4. Plasticizing System

The composition according to the invention comprises a plasticizing system. This plasticizing system is composed of at least one hydrocarbon-based resin and a plasticizing oil.

The total content of plasticizer in the composition is greater than or equal to 110 phr, preferably within a range extending from 110 to 160 phr, in particular from 110 to 150 phr, for example from 115 to 130 phr. Below 110 phr, the composition might have poorer performance in terms of industrial processability.

I-4-1 Hydrocarbon-Based Resin

The plasticizing system comprises a thermoplastic hydrocarbon-based resin. This resin is a solid at room temperature (23° C.), unlike a liquid plasticizing compound such as an oil.

Preferably, the thermoplastic plasticizing hydrocarbon-based resin has at least any one of the following characteristics:
  a Tg of greater than 0° C., preferably of greater than 30° C.;
  a number-average molecular weight (Mn) of between 400 and 2000 g/mol, more preferentially between 500 and 1500 g/mol;
  a polydispersity index (PI) of less than 3, more preferentially of less than 2 (as a reminder: PI=Mw/Mn with Mw being the weight-average molecular weight).

More preferentially, this thermoplastic plasticizing hydrocarbon-based resin has all of the above preferential characteristics.

The macrostructure (Mw, Mn and PI) of the hydrocarbon-based resin is determined by size exclusion chromatography (SEC); solvent tetrahydrofuran; temperature 35° C.; concentration 1 g/l; flow rate 1 ml/min; solution filtered through a filter with a porosity of 0.45 µm before injection; Moore calibration with polystyrene standards; set of 3 Waters columns in series (Styragel HR4E, HR1 and HR0.5); detection by differential refractometer (Waters 2410) and its associated operating software (Waters Empower).

The thermoplastic hydrocarbon-based resins may be aliphatic or aromatic or else of the aliphatic/aromatic type, that is to say based on aliphatic and/or aromatic monomers. They may be natural or synthetic and based or not based on petroleum (if this is the case, they are also known under the name of petroleum resins).

Suitable as aromatic monomers are, for example: styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a C9 fraction (or more generally from a C8 to C10 fraction). Preferably, the vinylaromatic monomer is styrene or a vinylaromatic monomer resulting from a C9 fraction (or more generally from a C8 to C10 fraction). Preferably, the vinylaromatic monomer is the minor monomer, expressed as molar fraction, in the copolymer under consideration.

According to a particularly preferential embodiment, the plasticizing hydrocarbon-based resin is selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, C5 fraction homopolymer or copolymer resins, C9 fraction homopolymer or copolymer resins, α-methylstyrene homopolymer or copolymer resins and the mixtures of these resins, which can be used alone or in combination with a liquid plasticizer, for example an MES or TDAE oil. The term "terpene" groups together here, in a known way, α-pinene, β-pinene and limonene monomers; use is preferential made of a limonene monomer, a compound which exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Mention will especially be made, among the above plasticizing hydrocarbon-based resins, of α-pinene, β-pinene, dipentene or polylimonene homo- or copolymer resins.

The preferential resins above are well known to those skilled in the art and are commercially available, for example sold as regards:
  polylimonene resins: by DRT under the name Dercolyte L120 (Mn=625 g/mol; Mw=1010 g/mol; PI=1.6; Tg=72° C.) or by Arizona under the name Sylvagum TR7125C (Mn=630 g/mol; Mw=950 g/mol; PI=1.5; Tg=70° C.);
  $C_5$ fraction/vinylaromatic copolymer resins, especially $C_5$ fraction/styrene or $C_5$ fraction/$C_9$ fraction copolymer resins: by Neville Chemical Company under the names Super Nevtac 78, Super Nevtac 85 and Super Nevtac 99, by Goodyear Chemicals under the name Wingtack Extra, by Kolon under the names Hikorez T1095 and Hikorez T1100 or by Exxon under the names Escorez 2101 and ECR 1273;
  limonene/styrene copolymer resins: by DRT under the name Dercolyte TS 105 from DRT or by Arizona Chemical Company under the names ZT115LT and ZT5100.

Mention may also be made, as examples of other preferential resins, of phenol-modified α-methylstyrene resins. In order to characterize these phenol-modified resins, it should be remembered that a number referred to as "hydroxyl number" (measured according to Standard ISO 4326 and expressed in mg KOH/g) is used in a known way. α-Methylstyrene resins, especially those which are phenol-modified, are well known to those skilled in the art and are commercially available, for example sold by Arizona Chemical under the names Sylvares SA 100 (Mn=660 g/mol; PI=1.5; Tg=53° C.); Sylvares SA 120 (Mn=1030 g/mol; PI=1.9; Tg=64° C.); Sylvares 540 (Mn=620 g/mol; PI=1.3; Tg=36° C.; hydroxyl number=56 mg KOH/g); and Sylvares 600 (Mn=850 g/mol; PI=1.4; Tg=50° C.; hydroxyl number=31 mg KOH/g).

In the composition of the invention, the content of plasticizing hydrocarbon-based resin is within a range extending from 70 to 100 phr, preferentially extending from 80 to 95 phr and even more preferentially from 85 to 90 phr.

I-4-2 Plasticizing Oil

The plasticizing system also comprises an extending oil which is liquid at 20° C., referred to as "low-Tg", that is to say which, by definition, has a Tg of less than 0° C., preferably less than −20° C., preferably less than −40° C.

Any extending oil, whether it is of aromatic or non-aromatic nature, known for its plasticizing properties with regard to diene elastomers can be used. At room temperature (20° C.), these oils, which are more or less viscous, are liquids (that is to say, as a reminder, substances which have the ability to eventually assume the shape of their container), in contrast especially to plasticizing hydrocarbon-based resins, which are by nature solids at room temperature.

Extending oils selected from the group consisting of naphthenic oils (low or high viscosity, especially hydrogenated or not), paraffinic oils, MES (medium extracted solvates) oils, TDAE (treated distillate aromatic extracts) oils, mineral oils, vegetable oils, ether plasticizers, ester plasticizers, phosphate plasticizers, sulfonate plasticizers and the mixtures of these compounds are particularly suitable. For example, mention may be made of those which contain between 12 and 30 carbon atoms, for example trioctyl phosphate. Mention may especially be made, as examples of non-aqueous and water-insoluble ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may especially be made, among the above triesters, of glycerol triesters, preferably predominantly consisting (for more than 50%, more preferentially for more than 80%, by weight) of an unsaturated C18 fatty acid, that is to say selected from the group consisting of oleic acid, linoleic acid, linolenic acid and the mixtures of these acids. More preferentially, whether it is of synthetic or natural origin (in the case, for example, of sunflower or rapeseed vegetable oils), the fatty acid used consists, for more than 50% by weight, more preferentially still for more than 80% by weight, of oleic acid. Such triesters (trioleates) having a high content of oleic acid are well known; they have been described, for example, in application WO 02/088238 as plasticizing agents in tyre treads.

In the composition according to the invention, the content of extending oil is between 10 and 40 phr, more preferentially between 15 and 35 phr and more preferentially still between 20 and 30 phr. Below 10 phr of oil or above 40 phr of oil, the composition might have poorer performance in terms of grip, due to too high or too low a Tg of the mixture.

I-5 Other Possible Additives

The rubber compositions in accordance with the invention optionally also comprise all or a portion of the normal additives generally used in elastomer compositions especially intended for the manufacture of treads, such as, for example, pigments, protective agents, such as antiozone waxes, chemical antiozonants or antioxidants, plasticizing agents other than those described above, anti-fatigue agents, reinforcing resins, or methylene acceptors (for example novolac phenolic resin) or donors (for example HMT or H3M).

Of course, the compositions in accordance with the invention can be used alone or in a blend (i.e., in a mixture) with any other rubber composition which can be used for the manufacture of tyres.

It is obvious that the invention relates to the rubber compositions described above both in the "uncured" or non-crosslinked state (i.e., before curing) and in the "cured" or crosslinked, or also vulcanized, state (i.e., after crosslinking or vulcanization).

II-Preparation of the Rubber Compositions

The compositions are manufactured in appropriate mixers, using two successive phases of preparation which are well known to those skilled in the art: a first phase of thermomechanical working or kneading (sometimes referred to as "non-productive" phase) at high temperature, up to a maximum temperature of between 110° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in applications EP-A-0 501 227, EP-A-0 735 088, EP-A-0 810 258, WO00/05300 or WO00/05301.

The first (non-productive) phase is preferentially carried out in several thermomechanical steps. During a first step, the elastomers, the reinforcing fillers and the combination of plasticizers (and optionally the coupling agents and/or other ingredients, with the exception of the crosslinking system) are introduced into an appropriate mixer, such as a customary internal mixer, at a temperature between 20° C. and 100° C. and preferably between 25° C. and 100° C. After a few minutes, preferentially from 0.5 to 2 min, and a rise in the temperature to 90° C. or to 100° C., the other ingredients (that is to say, those which remain, if not all were put in at the start) are added all at once or in portions, with the exception of the vulcanization system, during a mixing ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling the mixture thus obtained, the vulcanization system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or slab, especially for laboratory characterization, or else extruded, in order to form, for example, a rubber profiled element used in the manufacture of semi-finished products, so as to obtain products such as a tread. These products can subsequently be used in the manufacture of tyres, according to techniques known to those skilled in the art.

The vulcanization (or curing) is carried out in a known way at a temperature generally between 130° C. and 200° C., under pressure, for a sufficient time which can vary, for example, between 5 and 90 min, as a function especially of the curing temperature, of the vulcanization system adopted, of the kinetics of vulcanization of the composition under consideration or else of the size of the tyre.

The examples which follow illustrate the invention without, however, limiting it.

III. Exemplary Embodiments of the Invention

III-1 Preparation of the Examples

In the examples which follow, the rubber compositions were produced as described above.

III-2 Characterization of the Examples

In the examples, the rubber compositions are characterized, before and/or after curing, as indicated below.

Tests Carried Out in the Laboratory on the Compositions

Mooney Viscosity or Mooney Plasticity (before curing):

Use is made of an oscillating consistometer as described in French Standard NF T 43-005 (1991). The Mooney plasticity measurement is carried out according to the following principle: the composition in the uncured state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 newton.metre). The lower the Mooney value, the lower the viscosity before curing and the better the processability of the composition.

Tensile tests (after curing):

These tests make it possible to determine the elasticity stresses and the properties at break. Unless otherwise indicated, they are based on Standard NF ISO 37 of Dec. 2005. The "nominal" secant moduli (or apparent stresses, in MPa, with respect to the strain, without unit) at 10% elongation ("MA10") are measured in second elongation (i.e., after an accommodation cycle). All these tensile measurements are carried out under the standard conditions of temperature (23±2° C.) and hygrometry (50±10% relative humidity). The breaking stresses (in MPa) and the elongations at break (in %) are also measured. For greater readability, the results will be shown in base 100, the value 100 being assigned to the control. A result of less than 100 will indicate a decrease in the value concerned and, conversely, a result of greater than 100 will indicate an increase in the value concerned.

Dynamic Properties

The dynamic property tan(δ)max is measured on a viscosity analyser (Metravib VA4000) according to Standard ASTM D 5992-96. The response of a sample of vulcanized composition (cylindrical test specimen with a thickness of 4 mm and a cross section of 400 $mm^2$), subjected to a simple alternating sinusoidal shear stress, at a frequency of 10 Hz, under standard temperature conditions (23° C.) according to Standard ASTM D 1349-99, is recorded. A peak-to-peak strain amplitude sweep is carried out from 0.1% to 50% (outward cycle) and then from 50% to 1% (return cycle). The result made use of is the loss factor (tan δ). For the return cycle, the maximum value of tan δ observed (tan(δ) max) is indicated.

The lower the value for the tan(δ)max at 23° C., the lower will be the hysteresis of the composition and thus the lower will be the rolling resistance. For greater readability, the results will be shown in base 100, the value 100 being assigned to the control. A result of less than 100 will indicate a decrease in the value of tan(δ)max at 23° C. (reduction in the rolling resistance) and, conversely, a result of greater than 100 will indicate an increase in the value of tan(δ)max at 23° C. (increase in the rolling resistance).

The response of a sample of vulcanized composition subjected to a simple alternating sinusoidal shear stress during a temperature sweep; subjected to an imposed sinusoidal stress of 0.7 MPa and at a frequency of 10 Hz, the temperature ranging from −60° C. to 100° C., at a rate of 1.5° C. per minute, is also recorded. The Tg of the mixture is indicated by the temperature of the maximum of tan(δ), denoted "Tg (° C.) tan(δ) max". Another result made use of is the complex dynamic shear modulus (G*), for example at 60° C. For greater readability, the G* results will be shown in base 100, the value 100 being assigned to the control. A result of less than 100 will indicate a decrease in the value concerned and, conversely, a result of greater than 100 will indicate an increase in the value concerned.

Tests Carried Out on Tyres

Tyres according to the invention were subsequently prepared according to the usual methods, with the conventional constituents known to those skilled in the art: a crown, two sidewalls and two beads, a carcass reinforcement anchored to the two beads, a crown reinforcement and a tread, the tread being that described for the requirements of the present invention.

The properties of the tyres according to the invention can be evaluated by tests carried out on tyres as indicated below.

Wear Resistance Measurement Test

The wear resistance of the tyres was measured by a test referred to as rolling on a circuit, with an Audi A4 passenger vehicle with a theoretical load of 380 kg/tyre at the rear and 480 kg/tyre at the front, all with a pressure of 2 bar. The circuit is driven over under conditions making it possible to wear the tyres in a way which is reproducible between the control and the solution being tested: the vehicles travel in convoy, which guarantees that the tyres are subjected to the same conditions of speed, accelerations, temperature and nature of the ground. The rolling circuit is travelled around until a distance greater than 2500 km has been reached.

The front right-hand tyre of the vehicle is considered. The control tyre and the solution being tested are weighed before rolling and after more than 2500 km. The weight lost by the control fixes a wear performance at 100%. A solution having a value of greater than 100 represents an improved result, that is to say a smaller weight lost.

Grip Test: Braking on Dry Wet Ground, with ABS System

The tyres are fitted to a Volkswagen Golf passenger vehicle, each axle being ballasted to its maximum permissible weight, and the distance required to go from 80 km/h to 20 km/h is measured during sudden braking on wet ground (asphalt concrete). A solution having a value of greater than 100 represents an improved result, that is to say a shorter braking distance.

III-3 Examples

The compositions are manufactured with introduction of all of the constituents onto an internal mixer, with the exception of the vulcanization system. The vulcanization agents (sulfur and accelerator) are introduced onto an external mixer at low temperature (the constituent rollers of the mixer being at approximately 30° C.).

The object of the examples presented in Table 1 is to compare the different rubber properties of a composition C1 in accordance with the invention to a series of control compositions (T1 to T6). The measurement results for the properties measured, before and after curing, are presented in Table 2.

TABLE 1

| | Composition | | | | | | |
|---|---|---|---|---|---|---|---|
| | T1 | T2 | T3 | T4 | T5 | T6 | C1 |
| SBR1 (1) | 100 | 100 | 100 | 100 | 100 | 100 | 100 |
| Carbon black (2) | 5 | 5 | 5 | 5 | 5 | 5 | 5 |
| Silica (3) | 110 | 90 | 110 | 90 | 150 | 150 | 150 |
| Coupling agent (4) | 12 | 12 | 8.8 | 7.2 | 12 | 12 | 12 |
| Liquid plasticizer 1 (5) | 30 | 30 | 30 | 30 | 10 | 20 | 30 |
| Hydrocarbon-based resin (6) | 85 | 85 | 85 | 85 | 90 | 80 | 85 |
| Total plasticizers | 115 | 115 | 115 | 115 | 100 | 100 | 115 |
| Zinc oxide | 3 | 3 | 3 | 3 | 3 | 3 | 3 |
| Stearic acid | 2.5 | 2.5 | 2.5 | 2.5 | 2.5 | 2.5 | 2.5 |
| Antioxidant (7) | 2 | 2 | 2 | 2 | 2 | 2 | 2 |
| Accelerator (8) | 3 | 3 | 3 | 3 | 3 | 3 | 3 |
| Diphenylguanidine (9) | 2 | 2 | 2 | 2 | 2 | 2 | 2 |
| Sulfur | 1 | 1 | 1 | 1 | 1 | 1 | 1 |

(1) SBR with 15% styrene units, 24% 1,2-butadiene units; 30% cis-1,4-butadiene units; and 46% trans-1,4-units. Tg = −65° C.
(2) ASTM grade N234 (Cabot)
(3) Silica, Zeosil 1165 MP from Solvay, HDS type
(4) Coupling agent: TESPT (Si69 from Evonik)
(5) TDAE oil, Vivatec 500 from Klaus Dahleke
(6) High-Tg C5/C9 hydrocarbon-based resin, Escorez 2173 from EXXON (Mn 810 g/mol)
(7) N-(1,3-Dimethylbutyl)-N'-phenyl-p-phenylenediamine, Vulkanox 4020 from Lanxess and antiozone wax
(8) N-Cyclohexyl-2-benzothiazolesulfenamide, Vulkacit CZ from Lanxess
(9) Diphenylguanidine, Vulkacit D from Lanxess

TABLE 2

| | Composition | | | | | | |
|---|---|---|---|---|---|---|---|
| | T1 | T2 | T3 | T4 | T5 | T6 | C1 |
| Plasticity ML (1 + 4) | 32 | 26 | 34 | 29 | 67 | 65 | 52 |
| MA10 (base 100) | 40 | 34 | 37 | 27 | 137 | 127 | 100 |
| G* modulus (base 100) | 58 | 43 | 53 | 38 | 125 | 124 | 100 |
| Tanδ max (base 100) | 71 | 52 | 70 | 53 | 114 | 106 | 100 |
| Tg (° C.) Tanδ max | −6.8 | −9.6 | −7.0 | −9.8 | 7.3 | 5.7 | −4 |

Compared to the control compositions, it is noted that the composition in accordance with the invention has the best balance of performance between Mooney (uncured viscosity), stiffness (MA10 and G*), hysteresis (Tan(δ)max at 23° C.), and the Tg (° C.) Tan(δ)max, which is a good indicator of grip when it is high. Indeed, composition C1 has a grip, an uncured viscosity and a stiffness far greater than those of compositions T1 to T4. The same composition C1, compared to compositions T5 and T6, offers a lower hysteresis, which is a sign of an improved rolling resistance of the tyres. These results show that the compositions of the invention enable good performance with regard to the essential aspects, which are processability, road behaviour, grip and rolling resistance. None of the control compositions enable as good a balance in all these performance properties simultaneously.

Table 3 presents another series of examples, comparing composition C1 with the controls T7 to T10, for which the results are presented in Table 4 below.

The results show again that the composition of the invention has the best balance of performance properties between uncured viscosity (Mooney), stiffness (MA10 and G*), hysteresis (Tan(δ)max at 23° C.), and grip (Tg (° C.) Tan(δ)max).

Compositions T7, T8 and C1 were used in treads on the tyres P-T7, P-T8 and P-C1, respectively, of dimension 225/45 R17, and these tyres were tested with regard to their wear and grip performance. The results are presented in Table 5 below.

It is clearly apparent that composition C1 in accordance with the invention enables a very significant improvement in the balance between wear and grip performance, compared to compositions T7 and T8.

TABLE 3

|  | Composition | | | | |
| --- | --- | --- | --- | --- | --- |
|  | T7 | T8 | T9 | T10 | C1 |
| SBR1 (1) | 0 | 0 | 100 | 0 | 100 |
| SBR2 (1a) | 70 | 0 | 0 | 0 | 0 |
| SBR3 (1b) | 30 | 0 | 0 | 0 | 0 |
| SBR4 (1c) | 0 | 100 | 0 | 100 | 0 |
| Carbon black (2) | 5 | 5 | 5 | 5 | 5 |
| Silica (3) | 90 | 150 | 150 | 150 | 150 |
| Coupling agent (4) | 7 | 12 | 12 | 12 | 12 |
| Liquid plasticizer 1 (5) | 0 | 85 | 85 | 30 | 30 |
| Liquid plasticizer 2 (5a) | 25 | 25 | 25 | 0 | 0 |
| Hydrocarbon-based resin (6) | 20 | 15 | 15 | 85 | 85 |
| Total plasticizers | 45 | 125 | 125 | 115 | 115 |
| Zinc oxide | 3 | 3 | 3 | 3 | 3 |
| Stearic acid | 2.5 | 2.5 | 2.5 | 2.5 | 2.5 |
| Antioxidant (7) | 2 | 2 | 2 | 2 | 2 |
| Accelerator (8) | 2 | 3 | 3 | 3 | 3 |
| Diphenylguanidine | 1.5 | 2 | 2 | 2 | 2 |
| Sulfur | 1 | 1 | 1 | 1 | 1 |

References (1) to (9): cf. Table 1
(1a) SBR with 27% styrene units, 5% 1,2-butadiene units; 15% cis-1,4-butadiene units; and 80% trans-1,4-units. Tg = −48° C.
(1b) SBR with 40% styrene units, 24% 1,2-butadiene units; 30% cis-1,4-butadiene units; and 46% trans-1,4-units. Tg = −30° C.
(1c) SBR with 31% styrene units, 63% 1,2-butadiene units; 20% cis-1,4-butadiene units; and 17% trans-1,4-units. Tg = −13° C.
(5a) Triphenyl phosphate, Disflamoll TP, from Lanxess

TABLE 4

|  | Composition | | | | |
| --- | --- | --- | --- | --- | --- |
|  | T7 | T8 | T9 | T10 | C1 |
| Plasticity ML (1 + 4) | 72 | 41 | 30 | 48 | 52 |
| MA10 (base 100) | 120 | 115 | 96 | 80 | 100 |
| G* modulus (base 100) | 155 | 109 | 33 | 203 | 100 |
| Tanδ max (base 100) | 52 | 125 | 26 | 230 | 100 |
| Tg (° C.) Tanδ max | −8 | −6 | −28 | 22 | −4 |

TABLE 5

|  | Tyre | | |
| --- | --- | --- | --- |
|  | P-T7 | P-T8 | P-C1 |
| Grip (base 100) | 71 | 100 | 100 |
| Wear (base 100) | 111 | 44 | 100 |
| Mean wear/grip | 91 | 72 | 100 |

The invention claimed is:

1. A rubber composition based on:
   100 phr (parts by weight per hundred parts by weight of elastomer) of a low-Tg styrene/butadiene elastomer, the glass transition temperature Tg of which is less than −60° C.;
   145 to 155 phr of reinforcing filler;
   115 to 130 phr in total of a plasticizing system comprising a hydrocarbon-based resin at a content within a range extending from 85 to 90 phr and a plasticizing oil at a content within a range extending from 20 to 30 phr; and
   a vulcanization system;
   wherein the reinforcing filler comprises at least 130 phr of silica and 1 to 5 phr of carbon black.

2. The rubber composition according to claim 1, wherein said low-Tg styrene/butadiene elastomer has a styrene content within a range extending from 3 to 40% by weight.

3. The rubber composition according to claim 1, wherein said low-Tg styrene/butadiene elastomer has a butadiene fraction having a content of 1,2-vinyl bonds of between 4% and 30% (mol %).

4. The rubber composition according to claim 1, wherein said low-Tg styrene/butadiene elastomer is functionalized by a function selected from the group consisting of functional groups comprising a carbon-tin bond, amino functional groups, functional groups comprising a silanol, functional groups comprising an alkoxysilane, carboxyl groups, polyether groups, epoxide groups and mixtures thereof.

5. The rubber composition according to claim 1, wherein the hydrocarbon-based resin has a Tg of greater than 0° C.

6. The rubber composition according to claim 5, wherein the hydrocarbon-based resin has a Tg of greater than 30° C.

7. The rubber composition according to claim 1, wherein the hydrocarbon-based resin has a number-average molecular weight of between 400 and 2000 g/mol.

8. The rubber composition according to claim 1, wherein the hydrocarbon-based resin has a polydispersity index PI of less than 3.

9. The rubber composition according to claim 1, wherein the plasticizing oil is selected from the group consisting of naphthenic oils, paraffinic oils, medium extracted solvates oils, treated distillate aromatic extracts oils, mineral oils, vegetable oils, ether plasticizers, ester plasticizers, phosphate plasticizers, sulfonate plasticizers and mixtures thereof.

10. A tire comprising the rubber composition according to claim 1.

11. The tire according to claim 10, wherein the rubber composition comprises all or part of the tread.

* * * * *